(12) United States Patent
Ibanez-Guzman et al.

(10) Patent No.: US 10,035,508 B2
(45) Date of Patent: Jul. 31, 2018

(54) DEVICE FOR SIGNALLING OBJECTS TO A NAVIGATION MODULE OF A VEHICLE EQUIPPED WITH THIS DEVICE

(71) Applicant: RENAULT s.a.s., Boulogne Billancourt (FR)

(72) Inventors: Javier Ibanez-Guzman, Raizeaux (FR); Vincent Fremont, Le Plessis Brion (FR); Stephane Bonnet, Margny-les-Compiegne (FR); Arthur De Miranda Neto, Longueil-Annel (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 15/307,273

(22) PCT Filed: Apr. 9, 2015

(86) PCT No.: PCT/FR2015/050939
§ 371 (c)(1),
(2) Date: Oct. 27, 2016

(87) PCT Pub. No.: WO2015/166156
PCT Pub. Date: Nov. 5, 2015

(65) Prior Publication Data
US 2017/0043771 A1 Feb. 16, 2017

(30) Foreign Application Priority Data
Apr. 30, 2014 (FR) ..................... 14 53910

(51) Int. Cl.
*B60W 30/095* (2012.01)
*B60W 40/04* (2006.01)
(Continued)

(52) U.S. Cl.
CPC ........ *B60W 30/0956* (2013.01); *B60W 40/04* (2013.01); *G01C 21/3697* (2013.01);
(Continued)

(58) Field of Classification Search
None
See application file for complete search history.

(56) References Cited

U.S. PATENT DOCUMENTS 5,979,586 A * 11/1999 Farmer ................. B60Q 9/008
180/169
7,391,301 B2 * 6/2008 Seike ................. B60R 25/1004
340/426.1
(Continued)

FOREIGN PATENT DOCUMENTS

| | | |
|---|---|---|
| DE | 10 2009 006113 A1 | 9/2009 |
| EP | 2 223 838 A1 | 9/2010 |
| WO | 2004/031877 A1 | 4/2004 |

OTHER PUBLICATIONS

Feng Liu, et al., "IMMPDA Vehicle Tracking System using Asynchronous Sensor Fusion of Radar and Vision," 2008 IEEE Intelligent Vehicles Symposium, XP55162672, Jun. 4-6, 2008, pp. 168-173.
(Continued)

*Primary Examiner* — Shelley Chen
(74) *Attorney, Agent, or Firm* — Oblon, McClelland, Maier & Neustadt, L.L.P.

(57) ABSTRACT

A device performs real-time signaling of at least one object to a navigation module of a vehicle. The device includes a first sensor to produce first-sensor data including a first captured position and a first captured speed of the object relative to the vehicle, at least one second sensor to produce second-sensor data including a second captured position and a second captured speed of the object relative to the vehicle, a synchronization module to produce synchronized data including a first synchronized position from the first cap-
(Continued)

tured position and the first captured speed and at least one second synchronization position from the second captured position and the second captured speed, and a merging module to produce merged data including a merged position from the first synchronized position and the second synchronized position to signal the object to the navigation module by communicating all or part of the merged data thereto.

11 Claims, 12 Drawing Sheets

(51) Int. Cl.
    *G01S 13/86*     (2006.01)
    *G01S 13/93*     (2006.01)
    *G06K 9/00*     (2006.01)
    *G06K 9/62*     (2006.01)
    *G01C 21/36*     (2006.01)

(52) U.S. Cl.
    CPC ............ *G01S 13/86* (2013.01); *G01S 13/862* (2013.01); *G01S 13/865* (2013.01); *G01S 13/867* (2013.01); *G01S 13/931* (2013.01); *G06K 9/00791* (2013.01); *G06K 9/629* (2013.01); *B60W 2420/42* (2013.01); *B60W 2420/52* (2013.01); *B60W 2550/10* (2013.01); *B60W 2550/302* (2013.01)

(56) References Cited

U.S. PATENT DOCUMENTS

| | | | |
|---|---|---|---|
| 7,725,228 B2 | 5/2010 | Kobayashi et al. | |
| 8,935,055 B2* | 1/2015 | Raghunathan | B60Q 1/085 382/103 |
| 2004/0263323 A1* | 12/2004 | Seike | B60R 25/1004 340/426.1 |
| 2007/0239495 A1* | 10/2007 | Osborn | G06Q 10/00 705/7.28 |
| 2010/0030474 A1* | 2/2010 | Sawada | B62D 15/0265 701/301 |
| 2010/0188864 A1* | 7/2010 | Raghunathan | B60Q 1/085 362/466 |
| 2010/0222960 A1 | 9/2010 | Oida et al. | |
| 2012/0035846 A1 | 2/2012 | Sakamoto et al. | |
| 2013/0218419 A1* | 8/2013 | Lind | B60R 21/00 701/45 |
| 2014/0139368 A1* | 5/2014 | Takaki | G01S 13/723 342/70 |
| 2015/0235140 A1* | 8/2015 | Rothermel | G06N 5/048 706/52 |
| 2015/0254985 A1* | 9/2015 | Fisher | G08G 1/166 348/148 |

OTHER PUBLICATIONS

James L. Crowley, et al., "Principles and Techniques for Sensor Data Fusion," Signal Processing, vol. 32, No. 1-2, XP026650218, May 1, 1993, (41 pages).

International Search Report dated Jul. 16, 2015 in PCT/FR2015/050939 filed Apr. 9, 2015.

French Search Report dated Jan. 21, 2015 in FR 1453910 filed Apr. 30, 2014.

* cited by examiner

DEVICE FOR SIGNALLING OBJECTS TO A NAVIGATION MODULE OF A VEHICLE EQUIPPED WITH THIS DEVICE

The invention concerns a device for signaling objects to a navigation module of a vehicle equipped with this device, notably a driverless motor vehicle.

The objective in signaling objects, notably objects constituting actual or potential obstacles, is to offer a driverless mobile system a natural or constrained perception of its environment. This perception is obtained by processing data acquired by video, lidar and/or radar, or even ultrasound, type sensors, notably by constructing a local and dynamic digital map of that environment from distances to the various objects in the scene and their speeds. This map serves as basic knowledge for planning and implementing appropriate automatic movements. For driverless vehicles of this kind, the perception process constitutes the first task to be carried out prior to decision and action. It supplies a specific representation of the environment and of its own status by extracting and integrating over time key properties obtained from the data from the sensors in order to be understandable to a computer.

The perception task performs two functions: it makes it possible firstly to detect the various moving or stationary objects in its near environment and secondly to estimate their status, such as their position relative to the vehicle, their speed, their direction, their size, etc. The perception therefore serves as input to the trajectory generation module and can be used to predict possible collisions and to perform obstacle avoidance. The perception is considered as the most important source of information for driverless vehicles.

For a few years there have been available on the market so-called "intelligent" sensors that are increasingly used in assisted braking systems (ABS). These intelligent sensors not only detect objects but can also characterize them. Despite this, they are not perfect, whence the necessity of improving the performance of perception systems by combining the use of complementary sensors. The use of a plurality of sensors also makes it possible to introduce the principle of redundancy in order to arrive at more robust perception systems, which are indispensible for driverless navigation. In these approaches merging multi-sensor data, the objective is to combine information from different sensors to improve the reliability, accuracy and completeness of a perceived situation. The output from a system of this kind is a list of objects with their attributes and a measurement of integrity. In a perception task, integrity may be defined as the ability to supply trusted information whilst considering noise (random errors), uncertain and aberrant measurements.

Most approaches to perception aim to be generic and therefore suffer from a problem as to the optimum nature for the target application and do not make it possible to supply high-level information to assist planning for driverless navigation. Through this new technical solution, we propose to improve the integrity of multi-sensor perception and to assist in decision-making for driverless navigation through extracting and taking into account contextual and semantic information obtained from the observed scene.

The document EP0928428B1 describes for example a method of evaluating the measurement quality of a distance measurement sensor on a driverless mobile system. Here the measurement quality is evaluated relative to a cell as a function of a number of other measurement sensors that arrive at the same state of occupancy of the cell as the sensor under evaluation, the measured quality being all the greater as the number of sensors confirming the occupancy status increases.

However, the method described has numerous disadvantages with regard to its use in a device for signaling one or more objects to a vehicle navigation module. Of these disadvantages there may be noted that of the necessity for cells that is linked to the measurement uncertainties in respect of objects straddling the grid separating the cells, notably mobile objects moving from one side to another between two sensor measurements. One of the problems arising here is then that of being able to dispense with a grid compartmentalizing the environment into cells. Another problem that arises is that of having sufficient data to signal each object to a navigation module as effectively as possible.

More generally, another problem as yet remaining in the prior art is that of improving the performance of detection and of exploitation of detection beyond a simple evaluation of quality.

To remedy the problems of the prior art, the invention consists in a device for real-time signaling of at least one object to a vehicle navigation module comprising a first sensor adapted to produce first-sensor data comprising a first captured position and first captured speed of the object relative to the vehicle, characterized in that it comprise:
- at least one second sensor adapted to produce second-sensor data comprising a second captured position and second captured speed of the object relative to the vehicle;
- a synchronization module adapted to produce synchronized data comprising a first synchronized position from the first captured position and first captured speed and at least one second synchronization position from the second captured position and second captured speed;
- a merging module arranged to produce merged data comprising a merged position from the first synchronized position and the second synchronized position in such a way as to signal said at least one object to the navigation module by communicating all or part of the merged data thereto.

The device advantageously comprises a risk evaluation module adapted to complete the merged data with a risk indicator associated with each object signaled and generated from the merged data.

Specifically, the risk evaluation module comprises a set of blocks for computing a score from fused data and a block for combining scores computed by some or all of the set of score computation blocks so as to generate the risk indicator of each object by combining scores.

Said set more particularly comprises a distance score computation block, an angle score computation block, a speed score computation block and/or an object type score computation block.

More particularly also, said set comprises at least one block for additionally computing a score from cartographic data.

More particularly again, said combination block is adapted to combine the scores by weighted summation of some or all of the computed scores.

The merging module is usefully adapted to merge at least one supplementary position synchronized to said merged position from the first synchronized position and the second synchronized position.

The synchronized data accessed by the merging module advantageously further includes a position variance associated with each synchronized position so as to effect a summation of the synchronized positions weighted by the associated variances to merge the synchronized positions.

The synchronized data advantageously further includes a position variance associated with each synchronized position, so that the merging module is adapted to produce merged data including a merged position from the first synchronized position and the second synchronized position so as to signal the same object to the navigation module by communicating to it said merged data when a Mahalanobis distance between said synchronized positions is below a predetermined threshold and not to produce merged data including a merged position from the first synchronized position and the second synchronized position so as to signal to different objects to the navigation module when said Mahalanobis distance is above the predetermined threshold.

The invention also consists in a motor vehicle characterized in that it includes a device according to the invention.

Other features and advantages of the invention will become apparent in the course of a reading of the following detailed description, for an understanding of which see the appended drawings, in which.

In the remainder of the description, elements having an identical structure or analogous functions will be designated by the same reference number.

Figure 1:
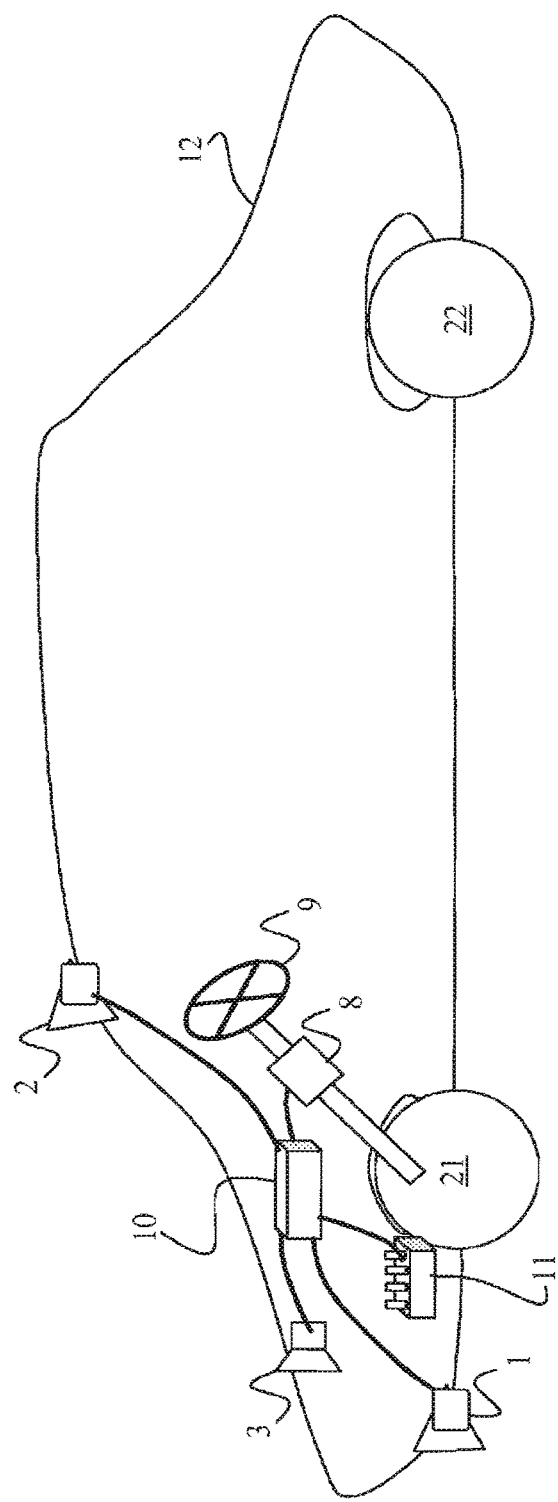
FIG. 1 is a diagram that represents a vehicle equipped with the signaling device according to the invention.

FIG. 1 shows a vehicle 12 equipped in the conventional way with front wheels 21, rear wheels 22 and a steering wheel 9 for steering the front wheels 21 via a steering column 8. Acceleration and deceleration of an electric, internal combustion or hybrid propulsion drive system 11 are controlled by an onboard electronic system 10 also programmed to monitor on the steering column 8 a pivoting angle α controlled from the steering wheel 9 in manual mode or from a navigation module 60 in driverless mode. A navigation module 60 includes in the manner known in itself a trajectory controller such as, for example but not necessarily, that described in the document WO 2014/009631. The onboard electronic system 10 is moreover connected directly or indirectly to action means on the vehicle 12, notably otherwise known mechanical means for braking the wheels 21, 22 in the event of a detected high risk of impact by the vehicle. The onboard electronic system 10 is connected to sensors 1, 2, 3, 4, without the number of sensors being limited to four, preferably installed on the vehicle to process received information on an environment of the vehicle by means of digital processing modules as explained next.

Figure 2:
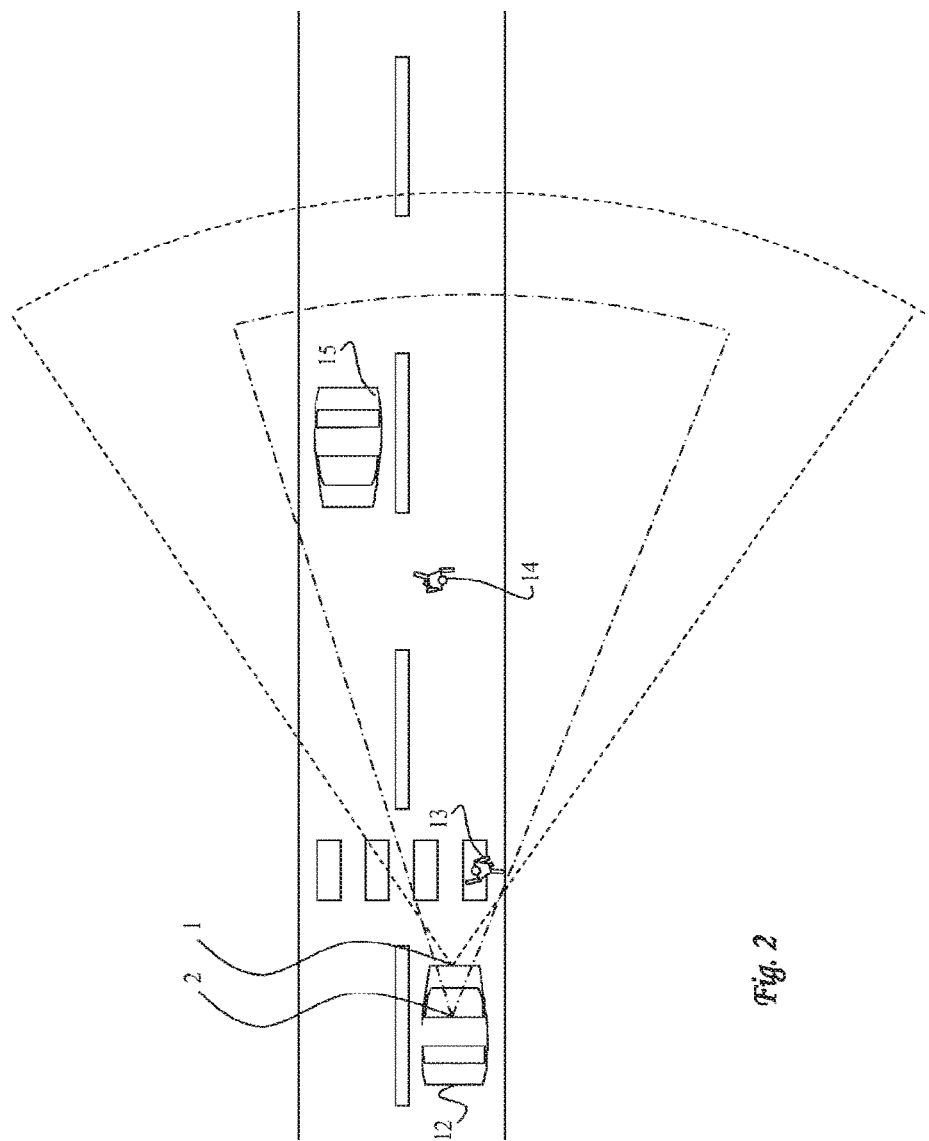
FIGS. 2 and 3 are diagrammatic views of the environment of the vehicle to explain the usefulness of the device with which it is equipped.

FIG. 2 shows a possible environment of the vehicle 12 occupied by objects 13, 14, 15 that may constitute fixed or mobile obstacles that the navigation module 60 must take account of to control movement of the vehicle 12 in this environment without risk of striking one of the objects. The sensor 1 is for example but not necessarily a radar perception sensor the perception field of which is represented in chain-dotted line to the front of the vehicle. The sensor 2 is for example but not necessarily a video camera the perception field of which is represented in dashed lines to the front of the vehicle. The use of sensors employing different technologies is beneficial for numerous reasons. For example, a video camera can make it possible to distinguish with greater precision the type of each object, pedestrian type for each of the objects 13 and 14, oncoming vehicle type for the object 15, road center type marked by out discontinuous lines on the ground, provided that the lighting and visibility conditions make this possible. Although type distinction is at a lower level for the radar perception sensor, the latter makes possible detection that is less susceptible to lighting and visibility conditions. Other types of sensors may be used such as by way of purely illustrative and non-exhaustive example of the stereo video camera, lidar, ultrasound or infrared type. At least two of the sensors used are intelligent sensors.

A sensor is referred to as intelligent when it is adapted to effect some processing of the signal that it captures, so as to detect the objects 13, 14, 15 and, for each object detected, to produce sensor data that includes a position and a speed of the object as captured in a frame of reference relative to the sensor. The sensors may advantageously also have parameters for going from the position and speed coordinates obtained in the frame of reference relative to the sensor 1, 2 into position coordinates x, y and speed coordinates Vx, Vy transposed into a frame of reference relative to the vehicle 12, for example taking account of where the sensor is installed on the vehicle. The data produced by each intelligent sensor i is preferably structured as a list Lci of detected objects $O_j$, $O_k$, $O_N$ including as a header a number N of objects detected by the sensor, a time stamp code $t_{sp}$ and a latency indicator $t_l$.

To produce the time stamp code $t_{sp}$ at the head of the list Lci, the sensor can access a universal clock, for example a GNSS (Global Navigation Satellite System) clock routinely available in the application module 60. The sensor 1, 2 then inscribes in the code $t_{sp}$ the time at which it produces the lists Lci (Lc1 for sensor 1, Lc2 for sensor 2). The sensor 1, 2 inscribes simultaneously in the latency indicator $t_l$ the time between the time of capture of the signal in real time and the time of producing the list Lci, in other words the delay resulting from processing the signal to produce the list Lci. The latency indicator $t_l$ can also take account of the speed of the perceived signal itself. It is known for example that the speed of sound is very much lower than the speed of light.

As explained in the remainder of the description, the invention may also be reduced to practice with sensors that do not produce the time stamp code $t_{sp}$ at the head of the list Lci.

Each object $O_j$, $O_k$, $O_N$ in the list Lci is associated with a sub-list of attributes comprising an object identifier Id, a position of the object identified by its position coordinates x,y, a speed of movement of the object identified by its speed coordinate Vx, Vy, a position uncertainty evaluated by means of statistical variances $\sigma^2 x$, $\sigma^2 y$, an object type (pedestrian for the object 13 or 14, vehicle for the object 15) and a dimension of the object, as this data is captured by the sensor i that produces the list Lci, i varying from 1 to Q where Q represents the number of sensors.

Accordingly, to each of the objects 13, 14, 15 situated in front of the vehicle both in the perception field of the sensor 1 and in that of the sensor 2 there correspond two sub-lists of attributes, one associated with the object in the list Lc1 of the sensor 1 and the other associated with the same object in the list Lc2 of the sensor 2.

Figure 3:
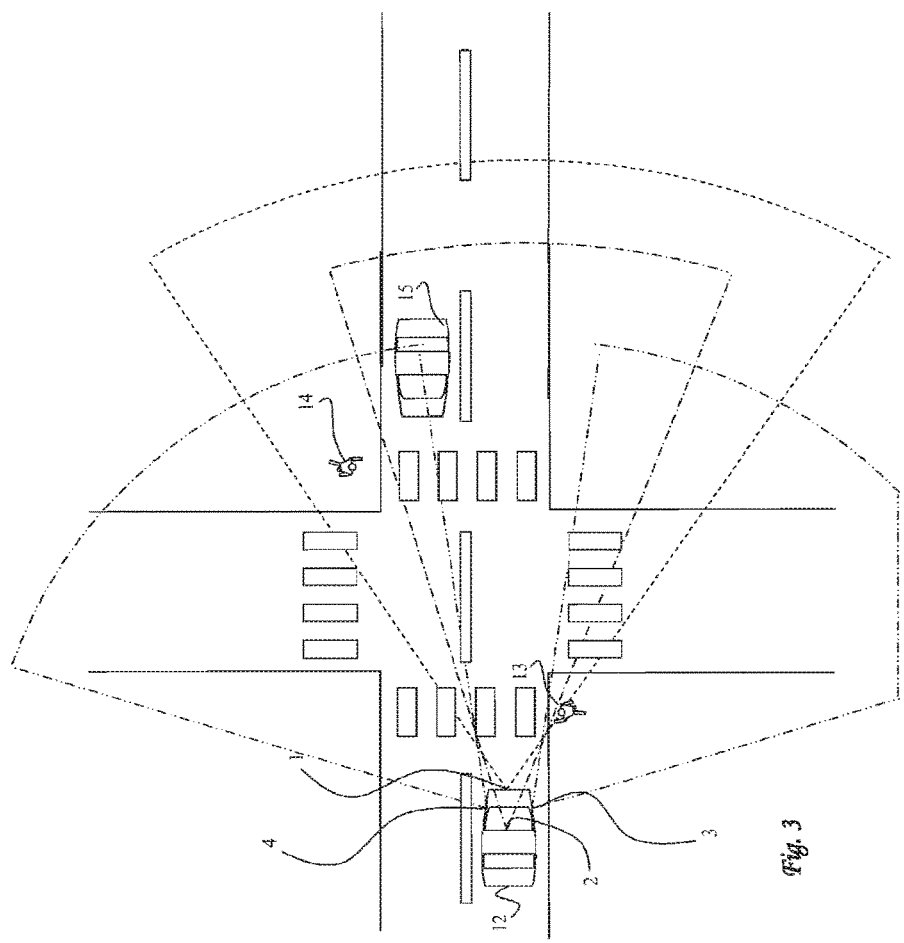

FIG. 3 shows another possible environment of the vehicle 12, occupied by the objects 13, 14, 15. The environment represented in FIG. 3 relates to a crossroads where objects may come as much from the right like the pedestrian type object 13 preparing to cross the road as from the left like the pedestrian type object 14 also preparing to cross the road.

The sensor 3, for example although not necessarily a radar perception sensor or a video camera, covers a perception field represented in intermittent chain-dotted lines to the front of the vehicle and on the righthand side. The sensor 4, for example but not necessarily a sensor of the same type as the sensor 3, covers a perception field represented in intermittent chain-dotted lines to the front of the vehicle and on the lefthand side.

Accordingly, to the object 13 that is situated to the front of the vehicle and on the righthand side both in the perception field of the sensor 1 and in that of the sensor 3 there correspond two sub-lists of attributes, one associated with the object 13 in the list Lc1 of the sensor 1 and the other associated with the object 13 in the list Lc3 of the sensor 3. Similarly, to the object 14 that is situated to the front of the vehicle and on the lefthand side both in the perception field of the sensor 1 and in that of the sensor 4, there correspond two sub-lists of attributes, one associated with the object 14 in the list Lc1 of the sensor 1 and the other associated with the object 14 as inventoried in the list Lc4 of the sensor 4. To the object 15 that is situated further to the front of the vehicle on the lefthand side in the perception field of the sensor 1, in that of the sensor 2 and in that of the sensor 4 there correspond more than two sub-lists of attributes, each associated with the object 15 in each of the lists Lc1 of the sensor 1, Lc2 of the sensor 2 and Lc4 of the sensor 4. It is beneficially possible to provide sufficient sensors to produce perception fields that cover all of the perimeter of the vehicle 12 with sectors of fields superposed at least two by two. It will therefore be clear that the number Q of sensors may exceed four and that it is beneficial as soon as it is equal to two.

Figure 4:
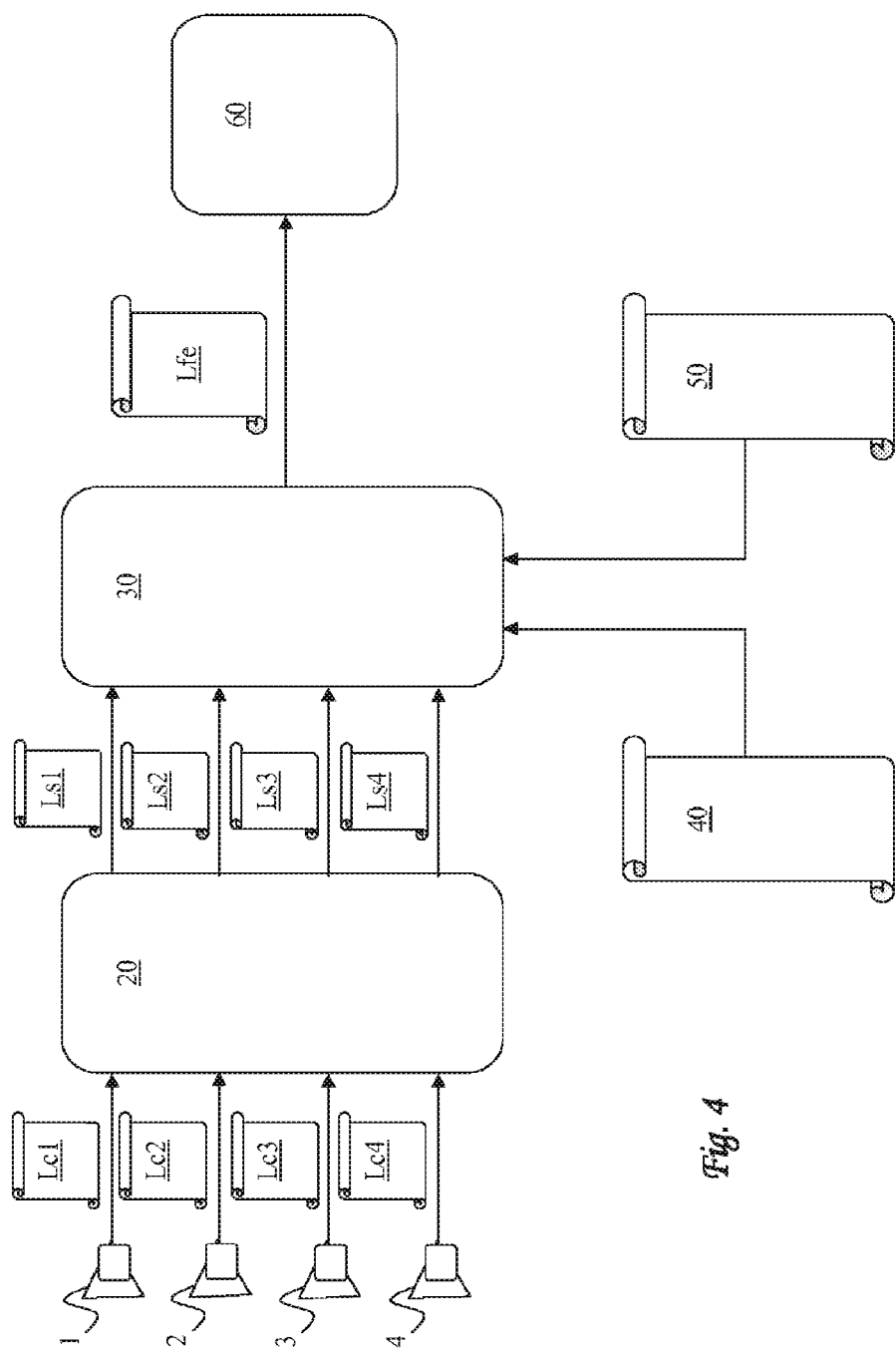
FIG. 4 is a block schematic of the device according to the invention.

The sensors 1, 2, 3, 4 are connected to the device illustrated by the FIG. 4 schematic, directly by a wired connection or by a local bus of one of the known types of bus: CAN type, LIN type, Ethernet automobile type, or other bus type, or possibly even via an external communication module if the invention is taken as far as using fixed sensors external to the vehicle. As a result, in the embodiment described here by way of illustration only by each of the lists Lc1, Lc2, Lc3, Lc4 each produced by one of the sensors 1, 2, 3, 4, the structured sensor data is communicated to a synchronization module 20.

Figure 5:
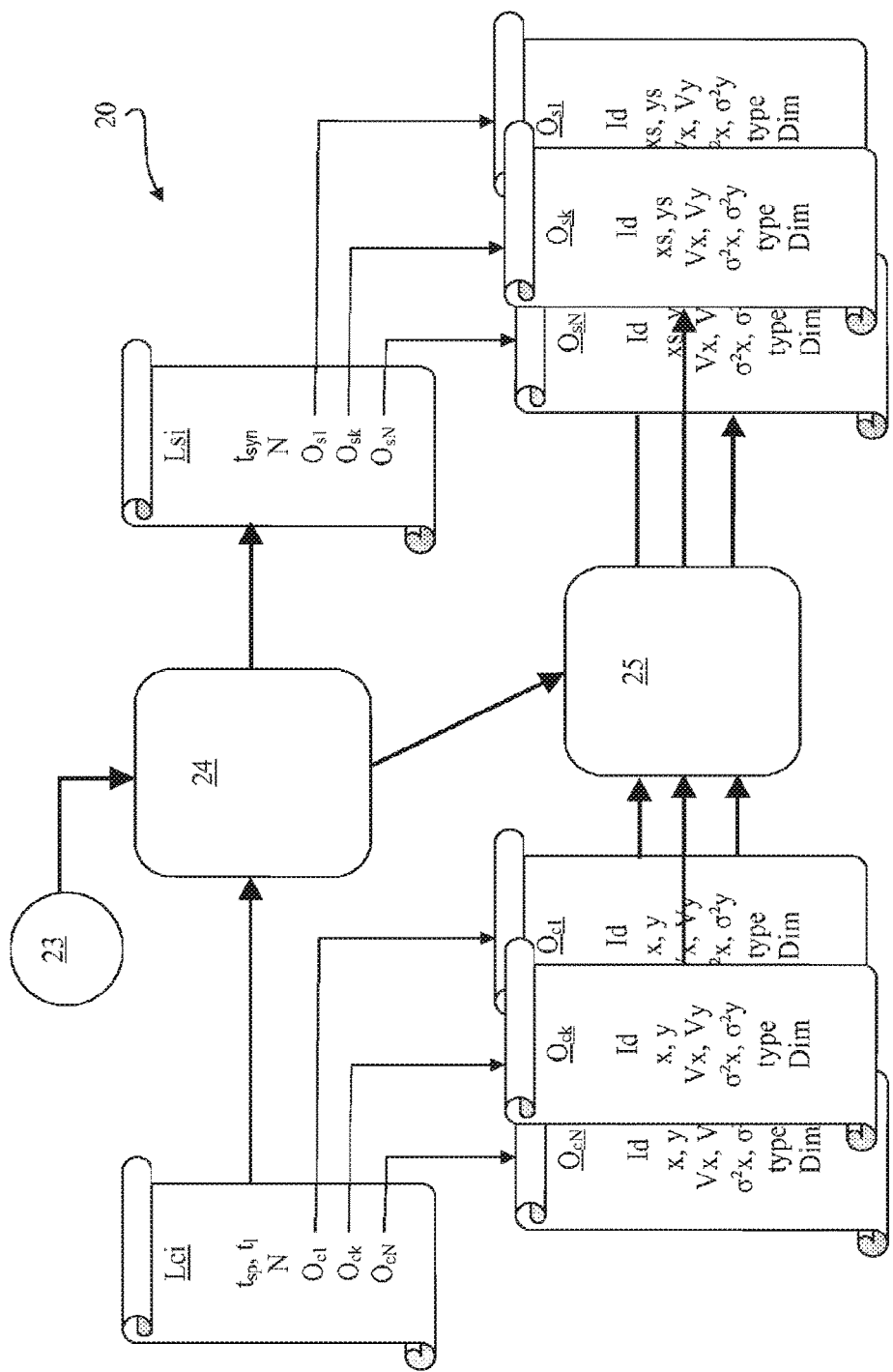
FIG. 5 is a block schematic of the synchronization module of the device from FIG. 4.

FIG. 5 is used to explain in more detail the structure and the operation of the synchronization module 20.

As seen above, each of the Q sensors is adapted to produce data structured here as a list Lci, i varying from 1 to Q. The list Lci contains a number N of objects $O_k$, k varying from 1 to N. It will be noted that the number N of objects may be different from one list Lci to another. Accordingly, in the FIG. 3 example, N has the value 3 for the list Lc1 that contains the objects 13, 14, 15, the value 1 for the list Lc2 that contains the single object 15, the value 1 for the list Lc3 that contains the single objects 13 and the value 2 for the list Lc4 that contains the objects 14 and 15.

As seen in FIG. 5, with each object $O_k$ from the list Lci there is associated a sub-list of attributes including a position and a speed of the object $O_k$ captured by the sensor i, the position being quantified by its coordinates x, y and the speed being quantified by its coordinates Vx, Vy in a frame of reference relative to the vehicle 12. The data produced by one sensor is asynchronous with respect to the data produced by another sensor because the capture times are not necessarily synchronous from one sensor to another, because of the time taken to process the signal, notably to distinguish the objects and to quantify the attributes of each object, vary from one sensor to another, and to a lesser degree because, differing from one sensor technology to another, the speed of the signal itself may produce a delay between the time at which the signal originates from the object and the time at which the signal is perceived by the sensor. The supplier of each sensor is generally in a position to determine a latency indicator $t_l$ that combines the processing time, if necessary the delay linked to the speed of the signal and possibly other delays that can easily be evaluated as a function of the known technology of the sensor held by the supplier. Depending on the technology employed, the value of the latency indicator $t_l$ is set in the memory of the sensor by the supplier or computed in real time by the sensor itself in a manner known in itself in the technological field of dedicated processors, as a function of its processing load.

Because of the possible movement of the object 13, 14, and/or the vehicle 12, the position of the object may have varied between the time indicated by the time stamp $t_{sp}$, which is that at which the data from the sensor is produced, and the earlier time $t_{sp}-t_l$ at which the object was actually at the position captured by the sensor.

The synchronization module 20 includes a sub-module 24 adapted to calculate a delay $\Delta t$ that separates a synchronization time $t_{syn}$ and the earlier time $t_{sp}-t_l$ at which the objects detected by the sensor i were each actually at the position captured by the sensor indicated in the associated sub-list of attributes.

To share the same synchronization time $t_{syn}$ with all of the sensors concerned, the sub-module 24 accesses a reference clock 23, for example of GNSS (Global Navigation Satellite System) type, that provides a universal reference time.

Because it is specific to each sensor i, the value of the latency indicator $t_l$ at the head of the list Lci comes from the sensor itself.

If the sensor installed on the vehicle is connected directly to the module 20 by a wired connection or by a real-time network of LIN or CAN type with a high priority level assigned to the frames emitted by the sensors, in other words if the time of production of the data by the sensor can be considered similar to the time of reception by the module 20, in particular by the sub-module 24, it is possible to introduce into the list Lci the time stamp code $t_{sp}$ directly at the input of the sub-module 24 that has the benefit of the reference clock 23. This makes it possible to use simpler sensors that then do not need to send the time stamp code $t_{sp}$ and consequently do not need to access a clock providing a universal reference time.

If the sensor installed on the vehicle is not directly connected to the module 20 by a wired connection, for example by a real time network of Ethernet 802.3 type over a twisted pair or of CAN type, with a low priority level assigned to the frames sent by the sensors, or for example via a remote communication network in the case of sensors external to the vehicle, in other words if the time of production of the data by the sensor may be considered significantly earlier than the time of reception by the module 20, in particular by the sub-module 24, it is preferable to introduce into the list Lci the time stamp code $t_{sp}$ directly at the output of the sensor or at the output of a system in the proximity of the sensor, one or the other being adapted to send the time stamp code $t_{sp}$ by accessing a clock providing the universal reference time.

To remedy the synchronization differences linked to the diversity of sensor types, to the transmission times of signals and data or to the processing load of the module 20 itself, the sub-module 24 is preferably adapted to verify a delay $t_{syn}-t_{sp}$ between the synchronization time $t_{syn}$ and the earlier time $t_{sp}$ at which the data was produced by the sensor i for processing by the sub-module 24.

If the delay $t_{syn}-t_{sp}$ is greater than or equal to a track obsolescence threshold $t_{TF}$ the data relating to the production date and time with the value $t_{sp}$ is not taken into account and the sub-module 24 does not generate a list Lsi for data synchronized from received data.

If the delay $t_{syn}-t_{sp}$ is less than the track obsolescence threshold $t_{TF}$, the sub-module 24 uses the delay Δt to produce synchronized data structured, in the example illustrated by FIG. 5, by means of lists Lsi of synchronized objects. Each list Lsi continues to be associated with the sensor i, with i having the values 1, 2, 3, 4 for example for the sensor 1, 2, 3, 4, respectively. While the values of $t_{sp}$ and $t_l$ may be different for each list Lci, all the lists Lsi contain the same value of $t_{syn}$ indicating the synchronization time common to all the lists Lsi. Each list Lsi may contain a number N of synchronized objects equal to the number N contained in the corresponding list Lci.

Each object $O_k$ in the list Lsi concerned is associated with a sub-list of attributes including a position and a speed of the object $O_k$ detected by the sensor i. Here the position is quantified by its coordinates xs, ys estimated at the time $t_{syn}$ common to all the objects and, for the same object, common to all the sensors that have detected that object.

The sub-module 24 communicates the computed delay Δt to a sub-module 25 that accesses the captured position and speed in the sub-list of attributes corresponding to the object $O_k$ in the list Lci of detected objects so as to calculate the synchronized position of the object $O_k$ using the following formulas:

$$xs := x + Vx \cdot \Delta t$$

$$ys := y + Vy \cdot \Delta t$$

In the sub-list of attributes at the output of the sub-module 25, the speed of the object $O_k$ may continue to be quantified by its coordinates Vx, Vy to the extent that the speed of each object may be considered constant during the delay Δt. The data produced by the module 20 is then synchronous for all the sensors.

Each list Lsi containing synchronized data produced by the module 20 (by way of illustration only in the lists Ls1, Ls2, Ls3, Ls4 from FIG. 4) is transmitted to a merging module 30 (explained in more detail next with reference to FIG. 6) to obtain an instantaneous snapshot of the environment of the vehicle 12.

The aim of the merging module 30 is to strengthen the confidence in the information supplied by exploiting the redundancy of the information added by using a plurality of sensors.

Figure 6:
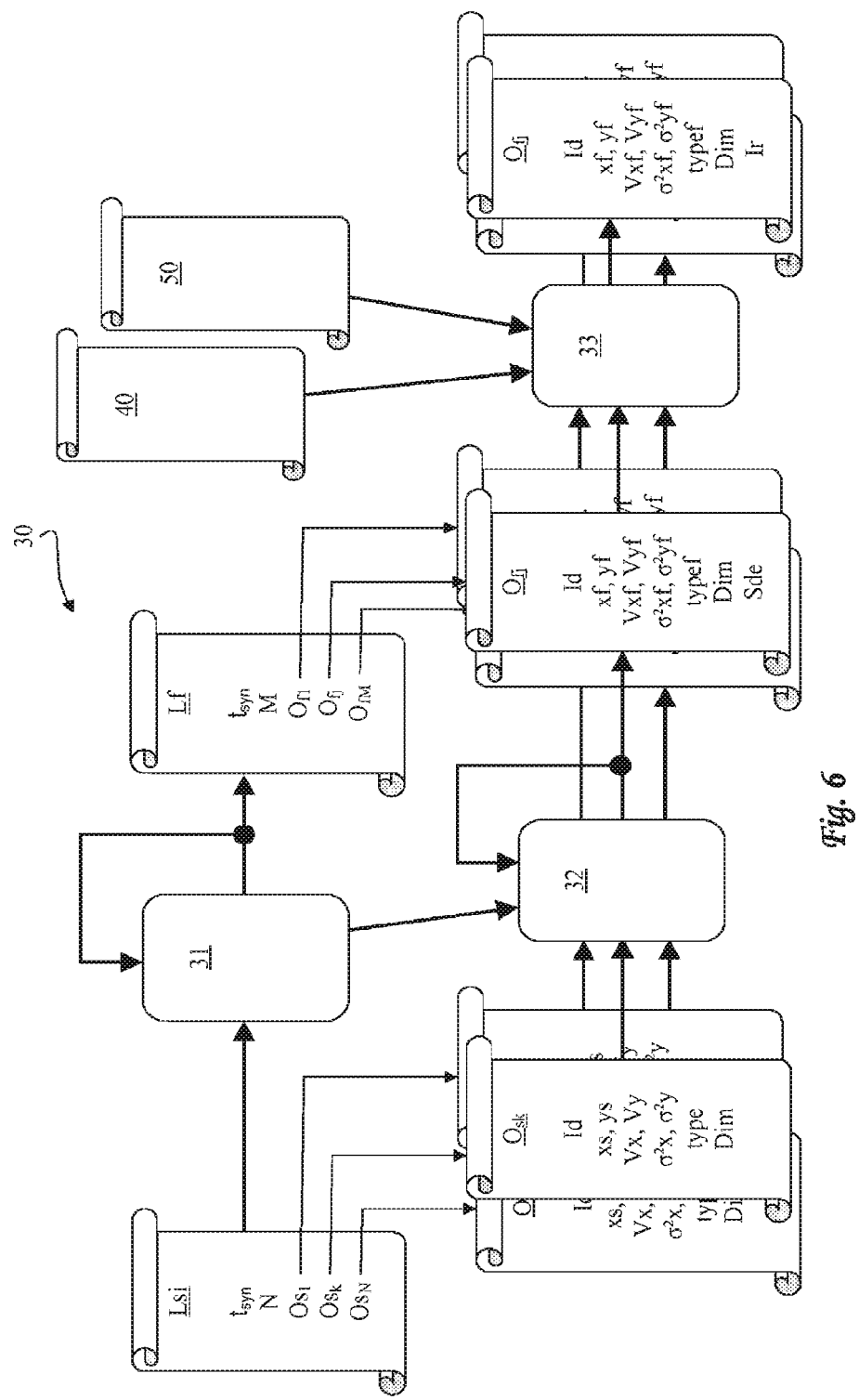
FIG. 6 is a block schematic of the merging module of the device from FIG. 4.

A sub-module 31 of the module 30 successively scans each list Lsi transmitted to the module 30 to produce merged data, structured in the embodiment illustrated by FIG. 6 by means of a merged list Lf that contains all the objects in the various lists Lsi of the various sensors where i is equal to 1, 2 and beyond.

The number M of objects $O_{fj}$ in the list Lf, with j varying from 1 to M, is therefore generally going to be greater than each number N of objects $O_{sk}$, with k varying from 1 to N, in each list Lsi of synchronized objects associated with each sensor.

The merged data is initialized so as to be the first synchronized data scanned by the module 30, for example that produced by the first sensor 1. In the example illustrated by FIG. 6, the list Lf initially reproduces the list Ls1 by pointing to sub-lists of attributes each of which reproduces a sub-list of attributes to which the list Ls1 points. It is beneficial to add in each sub-list of attributes to which the list Lf points an additional attribute Sde to quantify a detection score of the object $O_k$ associated with the sub-list of attributes concerned. The detection score is initialized to a value of unity.

From each synchronized list Lsi received the sub-module 31 combines the synchronized lists Lsi with the merged list Lf, for example as follows, until it reaches the last synchronized list corresponding to the last sensor.

Figure 12:
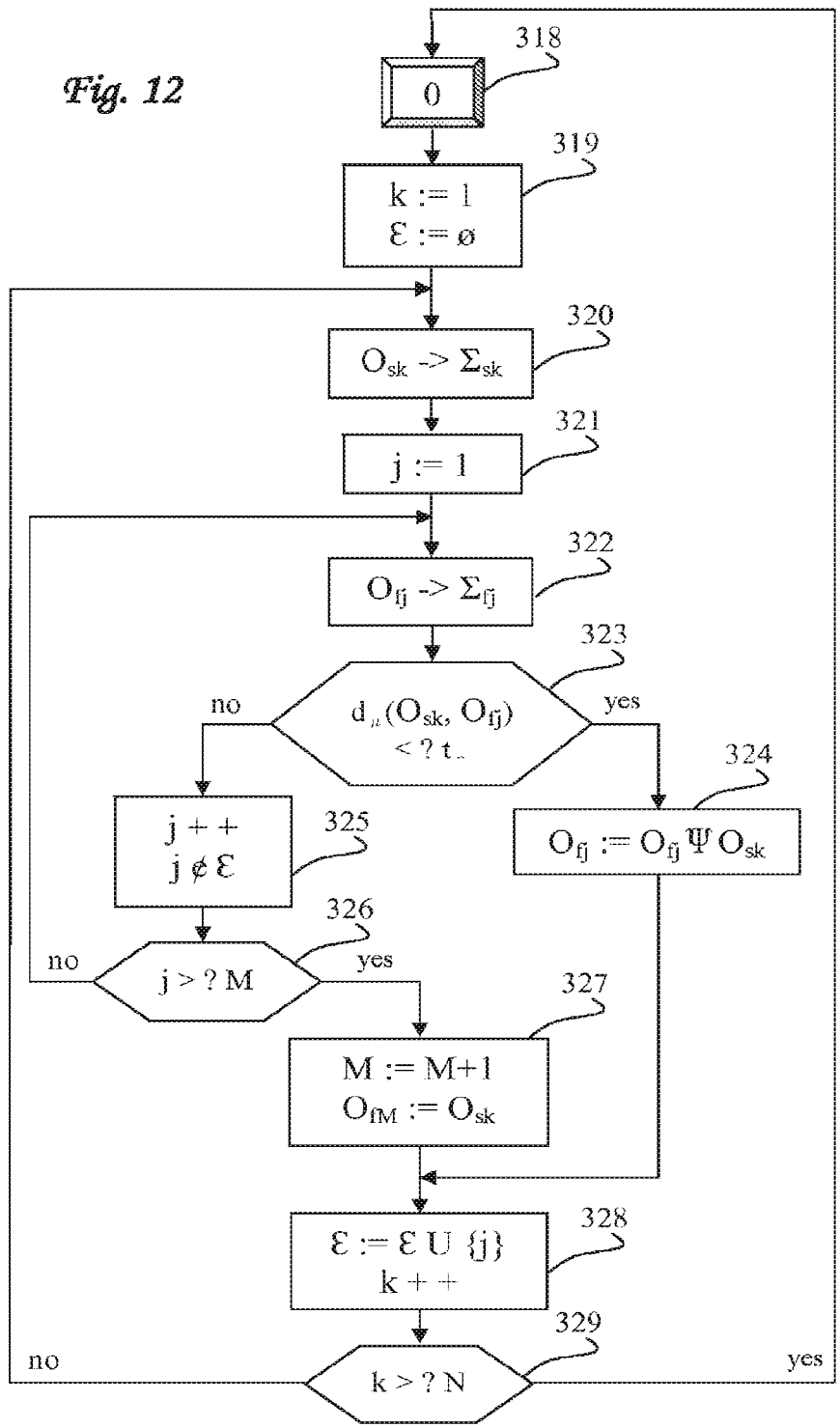
FIG. 12 shows steps of a method according to the invention.

A sub-module 32 of the module 30 is programmed to execute process steps comprising those explained next with reference to FIG. 12. The sub-module 31 communicates the data from the synchronized list Lsi to the sub-module 32 initially in a standby step 318 awaiting data communicated by the sub-module 31.

In a step 319, the sub-module 32 first goes to the first sub-list associated with the object $O_{sk}$ with k=1 in the list Lsi.

In a step 320, the sub-module 32 accesses a code variance matrix $\Sigma_{sk}$ linked to the object $O_{sk}$ with current index k on which it is positioned.

Considering the abscissa and ordinate values xs, ys obtained from the sensor as instantiating random variables Xs, Ys for quantifying the position of the object $O_{sk}$ relative to the vehicle 12 at the synchronization time $t_{syn}$, it should be remembered that the spread of the possible instances can be measured by means of the variances $var_k(Xs)$, $var_k(Ys)$ of each random variable and the covariances $cov_k(Xs, Ys)$, $cov_k(Ys, Xs)$ between the random variables, on the basis of which the code variance matrix $\Sigma_{sk}$ is defined by the following formula F1:

$$\sum\nolimits_{sk} = \begin{pmatrix} var_k(Xs) & cov_k(Xs, Ys) \\ cov_k(Ys, Xs) & var_k(Ys) \end{pmatrix}$$

Considering the independent random variables Xs, Ys, it should be remembered that the covariance matrix $\Sigma_{sk}$ can also be written in the following form F2:

$$\sum\nolimits_{sk} = \begin{pmatrix} \sigma_{xs}^2 & 0 \\ 0 & \sigma_{ys}^2 \end{pmatrix}$$

where $\sigma_{xs}$ and $\sigma_{ys}$ respectively designate the standard deviation of the random variable Xs and the standard deviation of the random variable Ys centered on the instances xs, ys, respectively.

The standard deviations can be determined easily or their squares determined easily and directly from the technical characteristics of the sensor concerned, as must be known to the supplier. If their values are constant, they can be stored in a memory of the device. If their values vary as a function of visibility, ambient temperature or other atmospheric factors detectable by the sensor, they can be transmitted in the list Lci and then transferred into the list Lsi. There may also be established in a manner known in itself a relationship between the square $\sigma^s_{xs}$, respectively $\sigma^s_{ys}$, of the standard deviation and the measurement uncertainty $\delta_{xs}$, respectively $\delta_{ys}$, of the sensor, for example for a normal law $\mathcal{N}$ centered on a zero average uncertainty:

$$\delta_{xs} \approx \mathcal{N}(0, \sigma^2_{xs}) \text{ respectively } \delta_{ys} \approx \mathcal{N}(0, \sigma^2_{ys})$$

In a step 321, the sub-module 32 starts by positioning itself on the first sub-list associated with the object $O_{fj}$ for which j=1 in the list Lf.

In step 322, the sub-module 32 accesses a covariance matrix $\Sigma_{fj}$ linked to the object $O_{fj}$ with current index j on which it is positioned.

The covariance matrix $\Sigma_{fj}$ is defined as above for the abscissa and ordinate values xf, yf for quantifying a representative object position $O_{fj}$ relative to the vehicle 12 at the synchronization time $t_{syn}$. The covariance matrix $\Sigma_{fj}$ may then be written here in the following form F3:

$$\Sigma_{fj} = \begin{pmatrix} \sigma^2_{xf} & 0 \\ 0 & \sigma^2_{yf} \end{pmatrix},$$

where $\sigma_{xf}$ and $\sigma_{yf}$ respectively designate the standard deviation of the random variable Xf and the standard deviation of the variable Yf centered on the instances xf, yf, respectively.

In a step 323, the sub-module 32 verifies if one or more merging criteria are satisfied. One remarkable criterion is that whereby a Mahalanobis distance $d_\mu(O_{sk}, O_{fj})$ between the objects $O_{sk}$ and $O_{fj}$ is less than a hashing threshold $t_n$. In the embodiment described here, the Mahalanobis distance is computed from the abscissa and ordinate values xs, xf, ys, yf of the objects $O_{sk}$ and $O_{fj}$ by means of the following formula F4:

$$d_\mu(O_{sk}, O_{fj}) = \sqrt{\begin{pmatrix} xs-xf \\ ys-yf \end{pmatrix}^T \begin{pmatrix} \sigma^2_{xs}+\sigma^2_{xf} & 0 \\ 0 & \sigma^2_{ys}+\sigma^2_{yf} \end{pmatrix}^{-1} \begin{pmatrix} xs-xf \\ ys-yf \end{pmatrix}}$$

If the merging criterion or criteria is or are satisfied, notably if the Mahalanobis distance is less than the hashing threshold, the sub-module 32 executes a step 324 that consists in modifying the object $O_{fj}$ by merging $\Psi$ the object $O_{sk}$ with the object $O_{fj}$ so as to obtain new attribute values computed in the following manner: notably by applying the Bayes rule to the position coordinates:

$$xf = \Psi_1(xf) = \frac{xf \cdot \sigma^2_{xs} + xs \cdot \sigma^2_{xf}}{\sigma^2_{xs} + \sigma^2_{xf}}$$

$$yf = \Psi_2(yf) = \frac{yf \cdot \sigma^2_{ys} + ys \cdot \sigma^2_{yf}}{\sigma^2_{ys} + \sigma^2_{yf}}$$

$$\sigma^2_{xf} = \Psi_3(\sigma^2_{xf}) = \frac{\sigma^2_{xf} \cdot \sigma^2_{xs}}{\sigma^2_{xs} + \sigma^2_{xf}}$$

$$\sigma^2_{yf} = \Psi_4(\sigma^2_{yf}) = \frac{\sigma^2_{yf} \cdot \sigma^2_{ys}}{\sigma^2_{ys} + \sigma^2_{yf}}$$

The other attributes of the modified merged object $O_{fj}$ can be requalified by applying the Bayes rule to them also with the appropriate standard deviations or in some other way.

For example, if it is wished to apply the Bayes rule to the speed coordinates, it is necessary for the sub-module 32 to be able to access the standard deviations of the synchronized speed coordinates. The speed coordinate Vxf, Vyf of the merged object $O_{fj}$ can also be requalified by producing a simple arithmetic mean of the speed coordinates Vxs, Vys of the synchronized object $O_{sk}$ and the speed coordinates Vxf, Vyf of the merged object $O_{fj}$. The same applies for example for the spatial dimensions Dim of the object.

Some attributes lend themselves only with greater difficulty to calculating the average, such as the type attribute, for example. For situations where the type would be different between detected objects eligible for merging, various solutions may be envisaged, such as that of retaining the type coming from the sensor that is the most reliable in this area, that of cumulative types, that of proceeding by voting in the case of objects coming from a plurality of sensors or that of considering the equality of type as the merging criterion to be satisfied.

If in the step 323 the merging criterion or one of the merging criteria is not satisfied, notably if the Mahalanobis distance is greater than or equal to the hashing threshold, the sub-module 32 executes a step 325 that consists in increasing the index j to go to the next sub-list associated with the object $O_{fj}$ in the list Lf until reaching the final sub-list with index j=M, checked in a step 326. The step 326 loops to the step 322 if j is not greater than or equal to M to verify if one or more merging criteria are satisfied for merging the synchronized object $O_{sk}$ with current index k with one of the merged objects from the list Lf.

A value of the index j greater than M indicates that it is impossible to modify one of the objects $O_{fj}$ by merging the object $O_{sk}$ with it. A positive response to the step 326 test activates a step 327 that consists in increasing by 1 the number M of objects from the list Lf so as to add thereto a merged object $O_{fj}$ with index j=M that reproduces the current synchronized object $O_{sk}$.

Following the step 324 in which the current synchronized object $O_{sk}$ was merged with one of the preexisting merged objects $O_{fj}$ in the list Lf or alternatively following the step 327 in which the current synchronized object $O_{sk}$ was added to the list Lf so as to generate a new merged object $O_{fj}$ a step 328 consists in increasing the index k to place the sub-module 32 on the sub-list associated with the next object $O_{sk}$ with the index k in the list Lsi by looping to the step 320 if the index k does not exceed the number N of synchronized objects received in the list Lsi.

In the step 329 that consists in testing the existence of this overshoot, the sub-module 32 loops to the weighting step 318 in the event of a positive response to the test so as to return control to the module 31 to tackle the next list Lsi up to the last of the latter produced from the sensors.

So as not to merge the same object $O_{fj}$ from the list Lf with two distinct objects $O_{sk}$ from the list Lsi, there may be provided a set ε initialized to the empty set Ø in the step 319, intended to list each index j of an object $O_{fj}$ from the list Lf that has already been modified or created from a preceding object $O_{sk}$ from the list Lsi. The set ε is then fed with the index j examined in the step 324 or in the step 327 when the sub-module 32 goes through the step 328 so as to take in step 325 a next index j outside the set E.

The output of the sub-module 31 therefore supplies to a risk evaluation sub-module 33 a complete list Lf of merged objects with their attributes in the form of merged data.

The sub-module 33 accesses a cartographic data structure 40 to construct list indicators in relation to each of the objects Ofj in combination with contextual data accessible in a data structure 50. The sub-module 33 uses otherwise known methods to rotate the vehicle 12 precisely using a GNSS receiver, digital navigation maps accessible in the data structure 40 and algorithms for extracting geometric primitives by vision, such as for example those described in the scientific paper Tao, Z. and Bonnifait, P. and Fremont, V. and Ibanez-Guzman, J., "Lane marking aided vehicle localization", *IEEE Conference on Intelligent Transportation Systems* (*IEEE ITSC*2013), October 6-9, The Hague, The Netherlands, 2013.

The digital processing of the navigation maps extracted from the data structure 40 enables the sub-module 33 to output accurately the position of the vehicle in its geometric environment so as to locate therein various resident objects that are sources of interaction with the vehicle 12 and with the other mobile objects. The sub-module 33 combines the configuration of the road scene constructed in this way with the context so as to define a level of risk associated with each object, with the aim of supplying high-level instructions to the navigation system. In the particular case of a vehicle moving in an urban environment, the use of cartographic data makes it possible to enrich the semantic description of the environment by evaluating a concept of risk linked to the obstacles related to the topology, the structure and the signage of the scene in which the vehicle is moving. Road markings, intersections, signs and other road specifics are used to improve the risk indicator linked to each detected object in the scene. For example, a vehicle coming from in front in a straight line but remaining in its lane is potentially less dangerous than a vehicle arriving from the left at an intersection.

The list evaluation sub-module 33 generates the risk indicator associated with each object $O_{fj}$ by combining different scores each generated by a block 133, 233, 333, 433 modeled on those illustrated by FIGS. 7 to 10.

Figure 7:
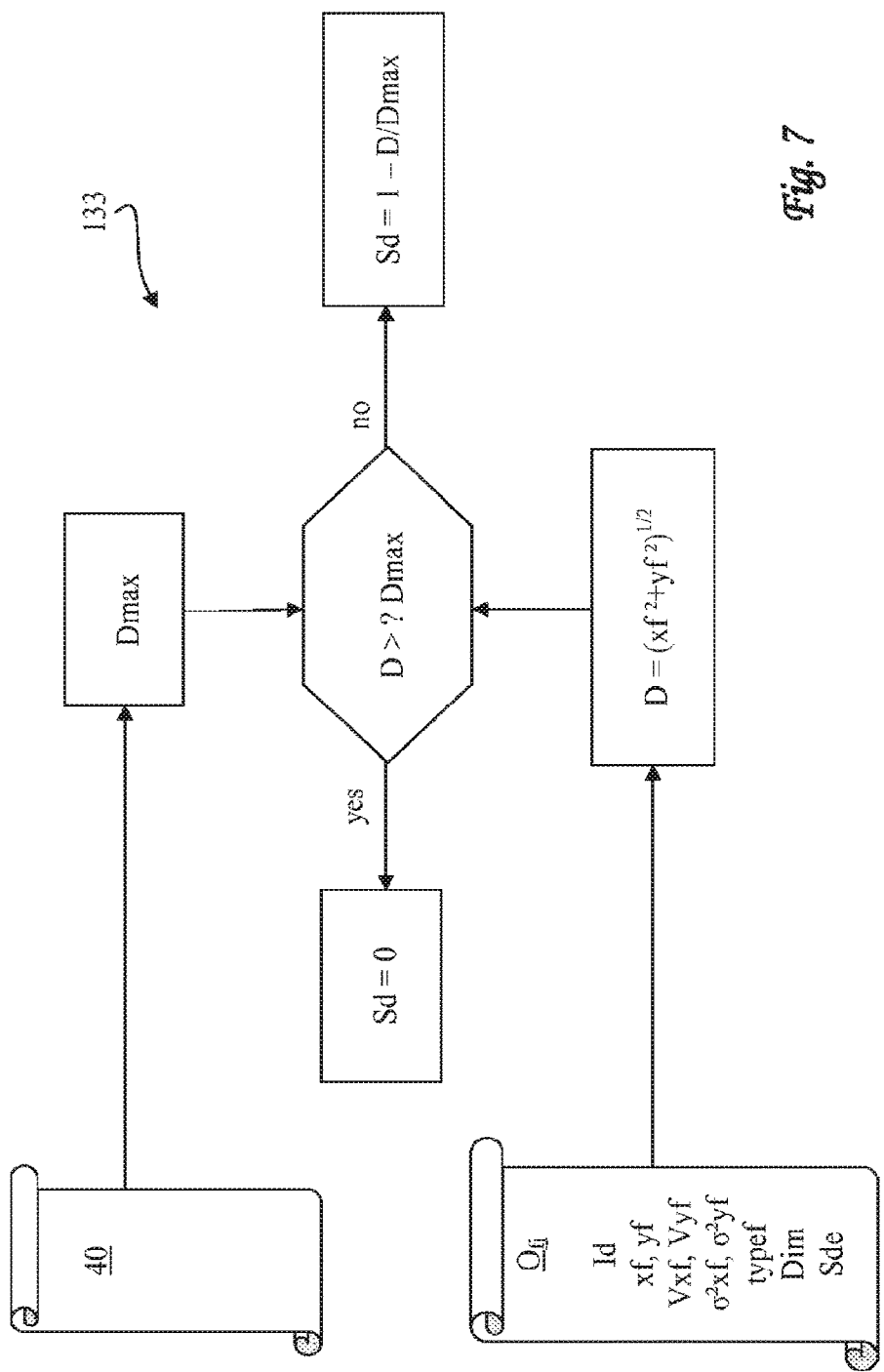
FIGS. 7 to 10 are flowcharts of risk factor score computation blocks.
Figure 8:
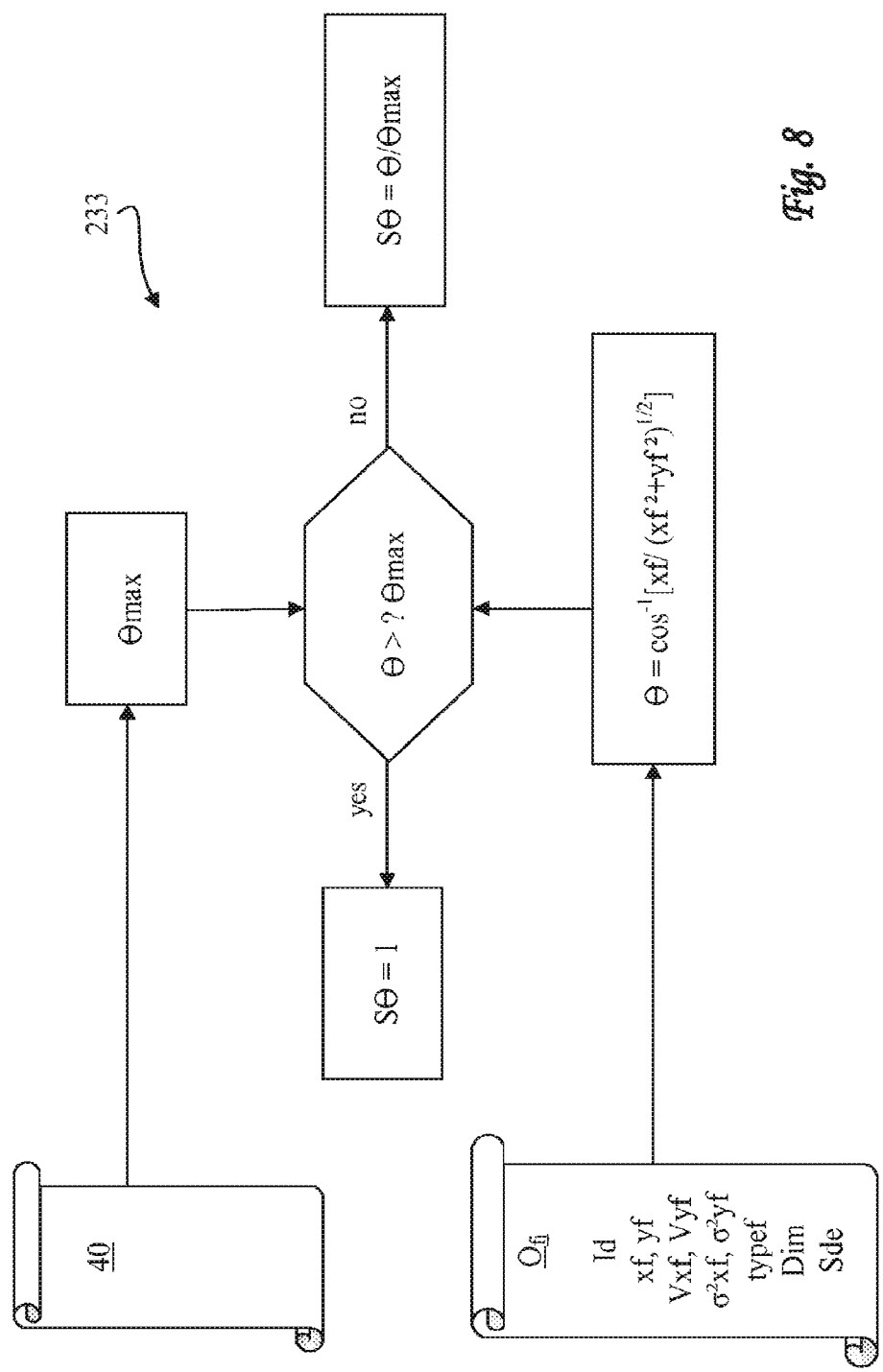

FIGS. 7 and 8 show generation of scores based on the Cartesian position and the angular position of the obstacle and on essentially contextual cartographic data. For example, the nearer the object and the more it encroaches on the lane of the vehicle 12, the more dangerous it is. On entering a crossroads, the distance and angle data is important for quantifying how dangerous the detected object is, for example whether it is coming from the left or from the right.

Referring to FIG. 7, the block 133 calculates a distance D that separates the object $O_{fj}$ and the vehicle 12. For example, the distance D is computed in the usual way from the coordinates xf, yf of the object in the frame of reference relative to the vehicle 12. The block 133 then compares the computed distance D to a maximum distance Dmax obtained from the data structure 40.

A distance score Sd is set at zero if the distance D is greater than the maximum distance Dmax. The distance score Sd is set at its maximum value, for example unity, if the distance D is zero. For other values of the distance D the block 133 calculates a score between zero and unity, for example by subtracting from unity the proportion of the maximum distance represented by the distance D.

The maximum distance Dmax is the distance beyond which there is no need to take into account any risk factor linked to the distance score Sd linked to the detected object. The value of the maximum distance may be taken as equal to the range of the sensor, to the possible braking distance of the vehicle 12 or to other values linked to a predefined risk evaluation strategy.

Referring to FIG. 8, the block 233 calculates an angle θ that separates an aiming axis of the object $O_{fj}$ and the longitudinal axis of the vehicle 12. For example, the angle θ is computed in the usual way from classical trigonometric rules applied to the coordinates xf, xy of the object in the frame of reference relative to the vehicle 12. The block 233 then compares the computed angle θ to a maximum angle θmax obtained from the data structure 40.

An angle score Sθ is set at zero if the angle θ is zero. The angle score Sθ is set at its maximum value, for example unity, if the angle θ is greater than the maximum angle θmax. For other values of the angle θ, the block 233 calculates a score between zero and unity, for example equal to the proportion of the maximum angle θmax represented by the angle θ.

The maximum angle θmax is the angle beyond which the risk factor linked to the target angle score Sθ of the detected object is considerably higher. The value of the maximum angle may be taken as equal to the angular scope of the sensor, to the turning capability of the vehicle 12 or to other values linked to a predefined risk evaluation strategy.

Figure 9:
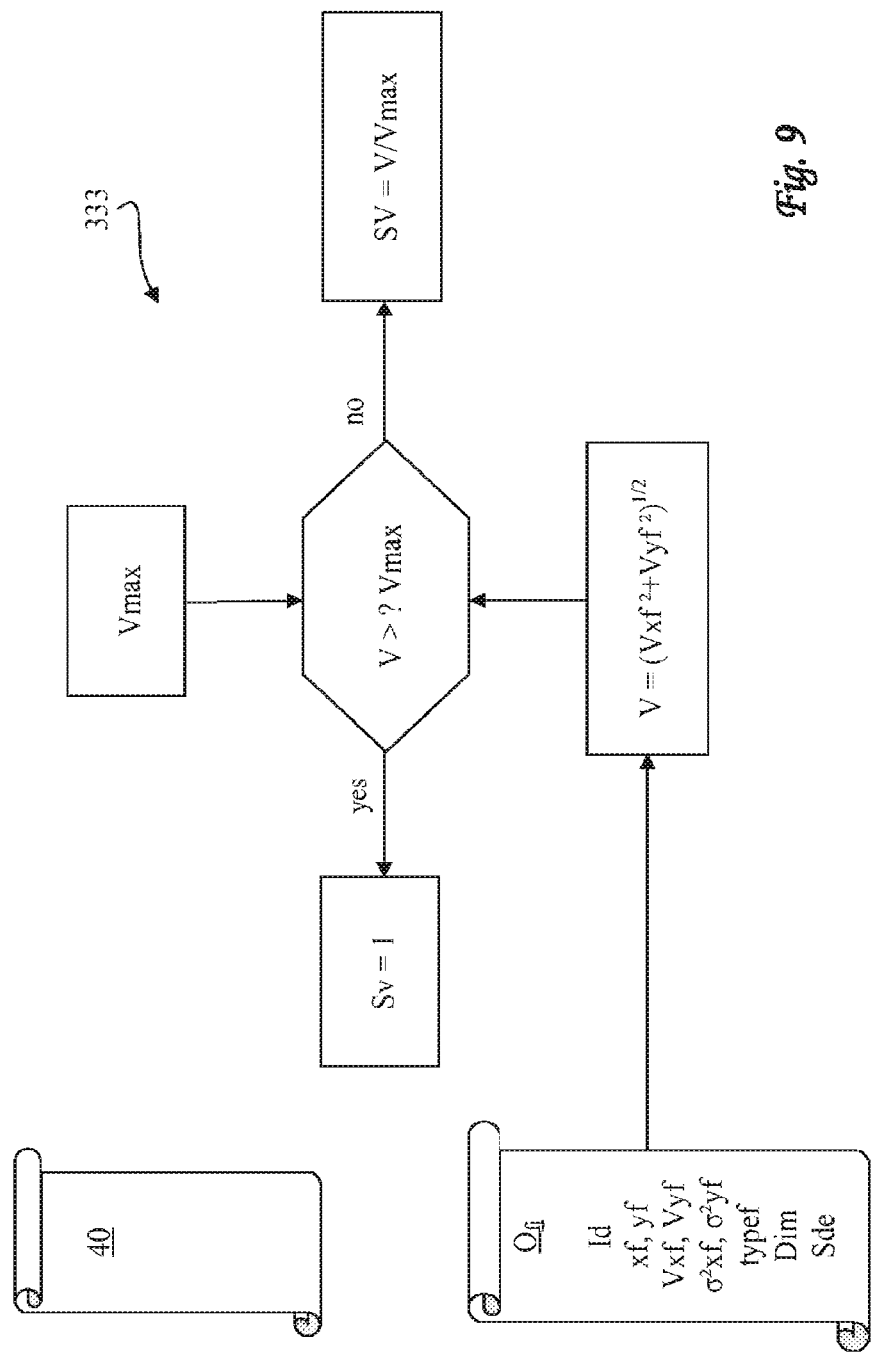

Referring to FIG. 9, the block 333 calculates a speed V at which the object $O_{fj}$ is moving relative to the vehicle 12. For example, the speed V is computed in the usual way from the speed coordinates Vxf, Vyf of the object in the frame of reference relative to the vehicle 12. The block 333 then compares the computed speed V to a maximum speed Vmax obtained from the data structure 40 or elsewhere.

A speed score Sv is set at unity if the speed V is greater than the maximum speed Vmax. The speed score Sv is set at its minimum value, for example zero, if the speed V is zero. For other values of the speed V, the block 333 calculates a score between zero and unity, for example as the proportion of the maximum speed represented by the speed V.

The maximum speed Vmax is the speed beyond which the risk factor linked to the speed score Sv for the movement of the detected object is considerably higher. The value of the maximum speed may be taken as variable as a function of its orientation toward the vehicle, the possible braking distance of the vehicle 12 or other values linked to a predefined risk evaluation strategy.

Figure 10:
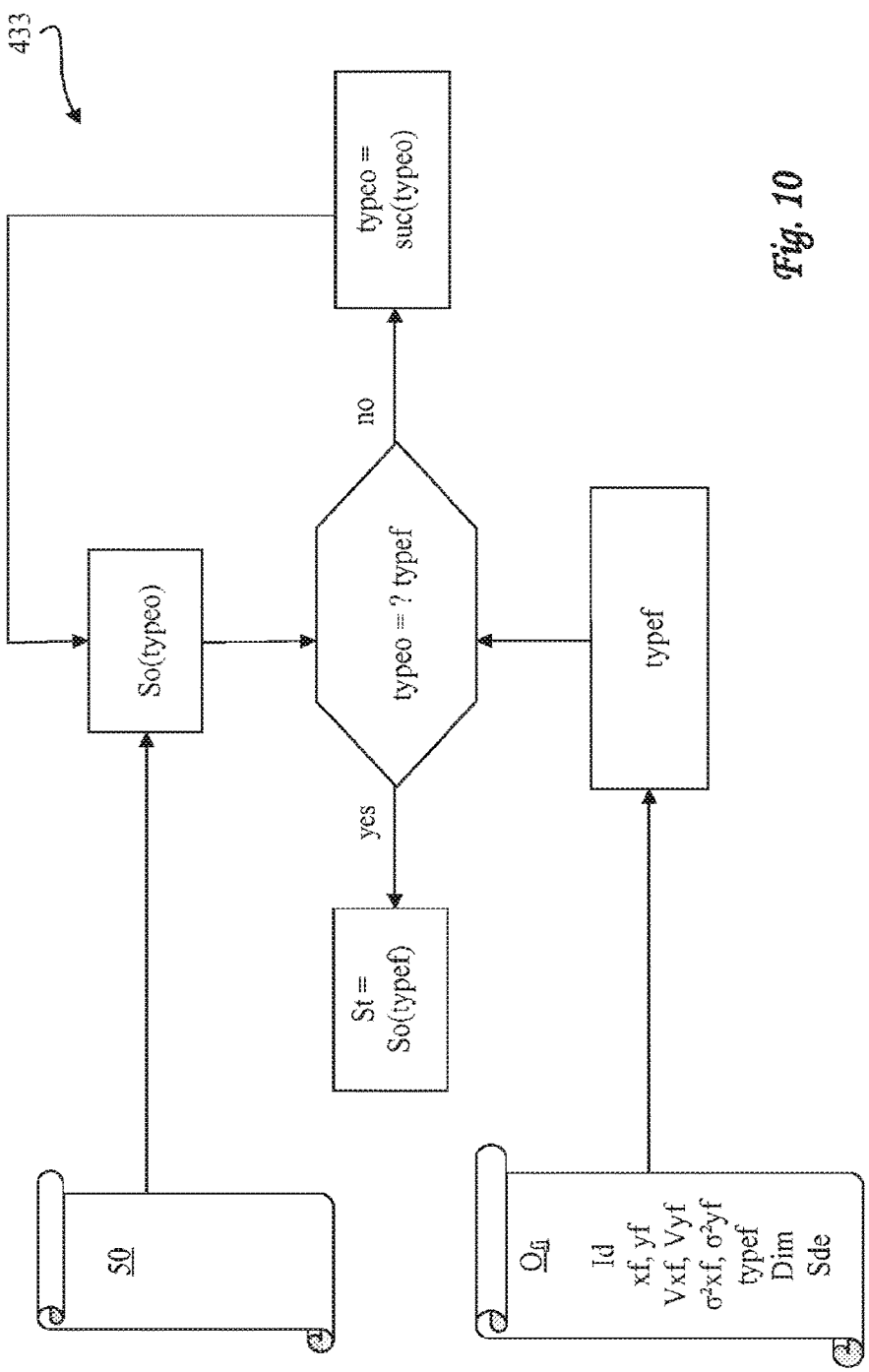

The function of the block 433 shown in FIG. 10 is to generate a score based on the type of obstacle in order to assign a vulnerability score as a function of the type of obstacle encountered: a pedestrian is more vulnerable than a car, for example, and must therefore be given more importance in the evaluation of the risk.

The block 433 extracts the obstacle type (typef) from the sub-list associated with the object $O_{fj}$. The block 433 then scans an associative table 50 of vulnerability scores each assigned to a type of obstacle until it finds the type of obstacle corresponding to the type of the current object.

A type score St is set at the value So (typeo) associated in the table 50 with the type (typeo) equal to the type (typeF) of the processed object.

Figure 11:
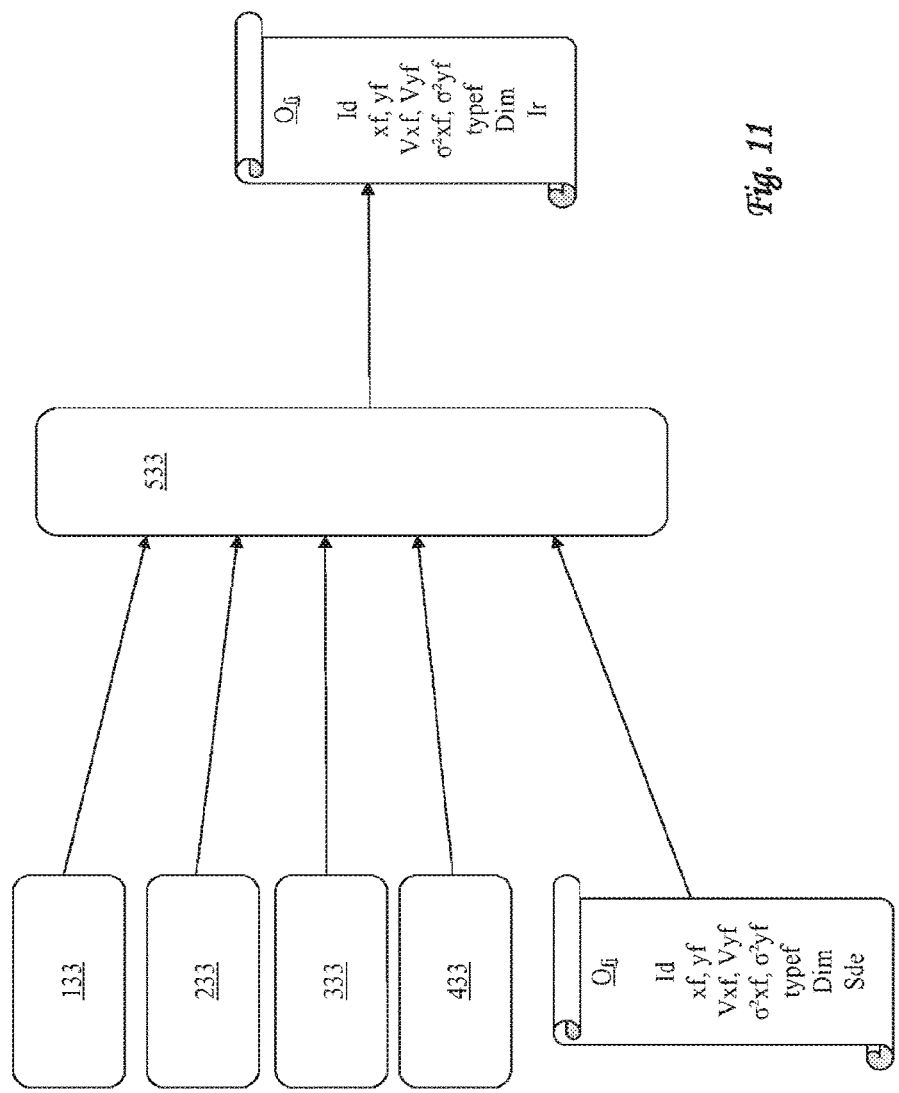
FIG. 11 is a score combination block flowchart for generating a risk indicator.

A block 533 enables the merging module 30 to produce a list Lfe of objects $O_{fj}$ as explained next with reference to FIG. 11.

The block 533 applies to the scores generated by the blocks 133, 233, 333, 433 a combining rule that depends on the intended use and that may for example be an average weighted as a function of navigation requirements. Other decision aid formalisms such as fuzzy logic or relief functions may be used to define the combining rule to be used. The result of the combination process yields a risk indicator lr that the block 533 adds to the sub-list of the object Ofj to which the list Lfe is pointing at this time.

The invention claimed is:

1. A device for real-time signaling of at least one object to a navigation device of a vehicle, the device comprising:
a first sensor arranged to produce first-sensor data comprising a first captured position and a first captured speed of the object relative to the vehicle;
at least one second sensor to produce second-sensor data comprising a second captured position and a second captured speed of the object relative to the vehicle;
a synchronization module implemented by circuitry and configured to produce synchronized data comprising a first synchronized position from the first captured position and the first captured speed and at least one second synchronization position from the second captured position and the second captured speed; and
a merging module implemented by the circuitry and configured to
produce merged data comprising a merged position from the first synchronized position and the second synchronized position in such a way as to signal said object to the navigation device by communicating all or part of the merged data thereto, and
determine a risk indicator associated with the object, the risk indicator being based on a distance score of a distance that separates the vehicle and the object, an angle score of an angle that separates the vehicle and the object, a speed score of a speed at which the object is moving relative to the vehicle, and an object score that is dependent on a type of the object, different types of objects having different score dependencies.

2. The device as claimed in claim 1, wherein the merging module is configured to complete said merged data with the risk indicator, which is associated with each object signaled and generated from said merged data.

3. The device as claimed in claim 2, wherein the merging module is configured to use a set of blocks for computing a score from merged data and a block for combining scores computed by some or all of the set of score computation blocks so as to generate the risk indicator of each object by combining scores.

4. The device as claimed in claim 3, wherein said set of blocks comprises at least one of a distance score computation block that computes the distance score, an angle score computation block that computes the angle score, a speed score computation block that computes the speed score, and an object type score computation block that computes the object score.

5. The device as claimed in claim 3, wherein said set of blocks comprises at least one block for additionally computing a score from cartographic data.

6. The device as claimed in claim 3, wherein said combination block is configured to combine the scores by weighted summation of some or all of the computed scores.

7. The device as claimed in claim 3, wherein said merging module is configured to merge at least one supplementary position synchronized to said merged position from the first synchronized position and the second synchronized position.

8. The device as claimed in claim 3, wherein the synchronized data accessed by said merging module further includes a position variance associated with each synchronized position so as to effect a summation of the synchronized positions weighted by the associated variances to merge the synchronized positions.

9. The device as claimed in claim 3, wherein:
the synchronized data produced by the synchronization module further includes a position variance associated with each synchronized position; and
the merging module is configured to produce merged data including a merged position from the first synchronized position and the second synchronized position so as to signal a same object to the navigation device by communicating to the same object said merged data when a Mahalanobis distance between said synchronized positions is below a predetermined threshold and not to produce merged data including a merged position from the first synchronized position and the second synchronized position so as to signal two different objects to the navigation device when said Mahalanobis distance is above the predetermined threshold.

10. A motor vehicle, comprising:
a device including circuitry configured to
produce first-sensor data comprising a first captured position and a first captured speed of an object relative to the motor vehicle,
produce second-sensor data comprising a second captured position and a second captured speed of the object relative to the motor vehicle,
produce synchronized data comprising a first synchronized position from the first captured position and the first captured speed and at least one second synchronization position from the second captured position and the second captured speed,
produce merged data comprising a merged position from the first synchronized position and the second synchronized position in such a way as to signal the object to a navigation device of the motor vehicle by communicating all or part of the merged data thereto, and
determine a risk indicator associated with the object, the risk indicator being based on a distance score of a distance that separates the vehicle and the object, an angle score of an angle that separates the vehicle and the object, a speed score of a speed at which the object is moving relative to the vehicle, and an object score that is dependent on a type of the object, different types of objects having different score dependencies.

11. A method, comprising:
producing, using a first sensor, first-sensor data comprising a first captured position and a first captured speed of an object relative to a vehicle;
producing, using a second sensor, second-sensor data comprising a second captured position and a second captured speed of the object relative to the vehicle;
producing, using circuitry synchronized data comprising a first synchronized position from the first captured position and the first captured speed and at least one second synchronization position from the second captured position and the second captured speed;
producing, using the circuitry, merged data comprising a merged position from the first synchronized position and the second synchronized position in such a way as to signal the object to a navigation device of the vehicle by communicating all or part of the merged data thereto, and determining a risk indicator associated with the object, the risk indicator being based on a distance score of a distance that separates the vehicle and the object, an angle score of an angle that separates the vehicle and the object, a speed score of a speed at which the object is moving relative to the vehicle, and an object score that is dependent on a type of the object, different types of objects having different score dependencies.

\* \* \* \* \*